(12) United States Patent
Terry, III et al.

(10) Patent No.: US 8,070,949 B1
(45) Date of Patent: Dec. 6, 2011

(54) MICRO DIFFUSION OF OXYGEN FOR TREATMENT AND DISPERSAL OF WASTEWATER IN A DRAIN FIELD

(75) Inventors: Theophilus B Terry, III, Somerville, TN (US); Jeffrey G. Karl, Cordova, TN (US)

(73) Assignee: Ezflow, L.P., Old Saybrook, CT (US)

( * ) Notice: Subject to any disclaimer, the term of this patent is extended or adjusted under 35 U.S.C. 154(b) by 378 days.

(21) Appl. No.: 12/193,971

(22) Filed: Aug. 19, 2008

Related U.S. Application Data (60) Provisional application No. 60/965,408, filed on Aug. 20, 2007.

(51) Int. Cl.
*C02F 3/00* (2006.01)
(52) U.S. Cl. ............ 210/620; 210/621; 210/747.1; 210/150; 210/220; 210/170.08
(58) Field of Classification Search ............ 210/621, 210/220, 150, 620, 170.08, 747.1
See application file for complete search history.

(56) References Cited

U.S. PATENT DOCUMENTS

| | | | |
|---|---|---|---|
| 3,662,890 A | 5/1972 | Grimshaw | |
| 4,093,549 A | 6/1978 | Wilson | |
| 4,123,800 A | 10/1978 | Mazzei | |
| 5,254,253 A * | 10/1993 | Behmann | 210/607 |
| 5,441,632 A * | 8/1995 | Charon | 210/170.08 |
| 5,620,602 A | 4/1997 | Stuth | |
| 5,674,312 A | 10/1997 | Mazzei | |
| 5,863,128 A | 1/1999 | Mazzei | |
| 6,018,909 A | 2/2000 | Potts | |
| 6,173,526 B1 | 1/2001 | Mazzei | |
| 6,485,647 B1 | 11/2002 | Potts | |
| 6,605,219 B2 | 8/2003 | Lambert | |
| 6,726,401 B1 | 4/2004 | Potts | |
| 6,814,866 B1 | 11/2004 | Potts | |
| 6,887,383 B2 | 5/2005 | Potts | |
| 6,923,905 B2 | 8/2005 | Potts | |
| 6,959,882 B1 | 11/2005 | Potts | |
| 6,969,464 B1 | 11/2005 | Potts | |
| 7,157,011 B1 | 1/2007 | Potts | |
| 7,497,946 B2 | 10/2008 | Jessick | |
| 2003/0070985 A1 | 4/2003 | Potts | |
| 2003/0080037 A1 | 5/2003 | Mazzei | |
| 2003/0173293 A1 | 9/2003 | Potts | |
| 2004/0005193 A1 | 1/2004 | Mazzei | |
| 2004/0144256 A1 | 7/2004 | Mazzei | |
| 2004/0195159 A1 | 10/2004 | Potts | |
| 2004/0195177 A1 | 10/2004 | Potts | |
| 2005/0269253 A1 | 12/2005 | Potts | |
| 2005/0284811 A1 | 12/2005 | Potts | |
| 2006/0182497 A1 | 8/2006 | Potts | |

* cited by examiner

*Primary Examiner* — Chester Barry
(74) *Attorney, Agent, or Firm* — C. Nessler (57) ABSTRACT

Methods, systems and apparatuses are disclosed for improving the treatment of wastewater in a dispersal drainage trench by facilitating the direct aeration of wastewater passing through a drainage unit.

11 Claims, 9 Drawing Sheets

MICRO DIFFUSION OF OXYGEN FOR TREATMENT AND DISPERSAL OF WASTEWATER IN A DRAIN FIELD

BACKGROUND OF THE INVENTION

The present invention is directed generally to the improved use of air for drainage. More specifically, the present invention is directed to incorporating and directing passive or active aeration into drain field products placed in soil dispersal trenches, or into conduits to increase the residence time and surface area in order to better treat wastewater and effluent, and improving the flow characteristics of the effluent in the line by recirculating the wastewater and effluent flow from the terminal end of the field back downstream in the process.

The use of low-pressure piping to assist in septic drainage fields is known. In such known arrangements, pipes were often customized on-site. The low pressure piping typically delivered effluent under pressure from the lift station to the drainage field. Pretreatment of the wastewater leaving the septic tanks are also known. Such pretreatment allows the effluent to be further broken down before passing the effluent into the drainage field. These low-pressure systems also employ drainage field lines that terminate in the field. That is, there is no recirculation of the effluent. The effluent being treated reaches the drainage field and is released to the environment. However, such lines are easily affected by effluent clogging in the lines due the relative low pressure used in the lines, along with the inadequate treatment of the effluent in the line.

Drip irrigation systems are also known. While greater pressure is used initially in these lines, the tubing and emitters drop the effective pressure in the line to a minimal pressure at the point of drip. Further, such drip irrigation is largely used in agricultural applications rather than wastewater treatment. Because of the low pressure involved, pretreatment of the effluent leaving the septic tank is required since the effluent can easily clog the lines without pretreatment. A higher pressure alternative that reduces line clogging, while eliminating the need to separately pretreat the wastewater would be highly advantageous.

Aerobic Treatment Units (ATU's) are also known. These systems contain a volume of effluent to which air is added via a compressor and some type of air stone or bubbler, etc. This creates an aerobic environment that allows beneficial bacteria to thrive in the suspended water column and digest the organics in the effluent. Because the volume of water is great compared to the amount of air that can be supplied via the compressor and bubblers, the compressors must run continuously thus consuming large amounts of energy. A more efficient means to dissolve oxygen into the effluent while eliminating the need for an energy consuming compressor would be highly advantageous.

SUMMARY OF THE INVENTION

According to one embodiment, the present invention is directed to a method for improving drainage in soil dispersal trenches by providing a means for aerating wastewater and effluent as it passes through a conduit.

In a further embodiment, the present invention is directed to a method for providing aeration to an effluent, preferably in the form of micro bubbles of a gas, the gas preferably being air or oxygen. The gas is delivered to a dispersion media or other drainage product via pressure tubing that acts as an aeration chamber.

In a still further embodiment, the present invention is directed to an apparatus for treating wastewater and effluent, the system and apparatus comprising a dispersion media, such as a drainage product dimensioned to be placed in a drainage trench, with the drainage product substantially surrounding a conduit, such as, for example, a pressure pipe, etc. The preferred pressure pipe comprises openings or orifices through the pipe wall. The pressure pipe is attached to, or is otherwise in communication with a gas source for providing a gas flow to the pressure pipe within the drainage product. The gas source provides and/or delivers a gas flow, preferably air, oxygen, nitrogen, or a combination thereof, etc., to the pressure pipe, actively via a pump or other injector, or passively, such as, through a mixer-injector, or other gas entry means. The gas is substantially directed from the pressure pipe and into the aggregate bundle via the orifices in the pressure pipe wall. The gas is released through the orifices at a rate to preferably produce micro bubbles of gas that adhere to the aggregate, pipe, and the wastewater and/or effluent in contact with the aggregate, and any wastewater and/or effluent present within the tube. Preferably, the gas will further emanate from the pipe and aggregate bundle and infiltrate adjacent, surrounding soil to aid in decomposing effluent present in the nearby soil.

Still further, embodiments of the present invention contemplate the recirculation of partially treated waste water, or effluent, back from the field to the septic tank for further effluent treatment allowing for initiation and/or continuation of the Nitrogen Cycle in the septic tank. As the recirculated effluent is again directed out to the drainage field, the effluent's nitrogen-based compounds are converted to useful nitrogen and are made available to the surrounding environment in the field, enhancing the effluent's presence in the drainage field.

Additionally, embodiments of the present invention relate to methods and systems for aerobically treating wastewater comprising providing a conduit comprising a wall having a predetermined wall thickness, a predetermined inner diameter and predetermined length. At least one source material is provided in communication with the conduit. A fluid flow, such as a wastewater or other drainage flow, flow is directed into the conduit from a wastewater source. The wastewater is at least partially treated in the conduit with the source material before, or as it is being directed from the conduit to one or more pre-selected destinations.

BRIEF DESCRIPTION OF THE DRAWINGS

Other objects, features, embodiments and advantages will occur to those skilled in the field from the following description of preferred embodiments and the accompanying drawings, in which.

DETAILED DESCRIPTION

The present invention recognizes, and, for the first time, implements beneficial aspects of recirculated and aerated effluent dispersed into drainage product preferably placed within shallow soil dispersal trenches. According to the present invention, conduits, or tubing, preferably made from polyethylene, most preferably HDPE, are manufactured to comprise spaced holes, or orifices through the wall of the conduits. The conduits are oriented, preferably substantially longitudinally within the aggregate bundles. The conduits are in communication with a line capable of providing a gas flow to the conduit. In one embodiment of the present invention, a preferably cavitating venturi-type component, such as, a mixer-injector is in communication with the line to assist in introducing a beneficial gas, such as, for example, atmospheric oxygen into the line, though the conduit, and into the effluent flow. Such a mixer-injector is the subject of U.S. Pat. No. 5,863,128, which is incorporated by reference herein as if made a part of the present application.

According to one embodiment of the present invention, the process results in (passively or actively) beneficially aerated wastewater, preferably with micro bubbles of oxygen present. This aerated wastewater is then: 1) either dosed into the drainage product and eventually released into the surrounding soil (where the added oxygen increases the soil's ability to treat organic matter), or 2) returned either to the primary septic tank or pump tank. The primary septic tank is often an anoxic zone that has readily available sources of carbon. Such a zone then creates the conditions necessary to initiate the Nitrogen Cycle, and beneficially reduces the amount of nitrogen within the wastewater effluent.

It is understood that embodiments of the present invention may treat any wastewater fluid, including fluids containing amounts of semi-solid material. The apparatuses, systems and methods of the present invention are used to treat such fluid supplied from a wastewater fluid source, rendering an aerated wastewater flow. This partially treated wastewater becomes what is conventionally thought of as an effluent fluid, once such treatment prepares the wastewater flow for release into the environment. According to the present invention, rather than release all of the effluent to the environment, some portion of effluent may be routed back to a holding, pump, septic or other tank. Since this effluent may then mix in the holding tank with untreated or partially treated wastewater, it is understood that both wastewater and effluent may pass, together or individually, through the apparatuses of the present invention. For purposes of the present application, the terms "fluid" and "wastewater fluid" and "wastewater flow" refer to both effluent fluid and liquefied sewage alone or in combination.

Figure 1:
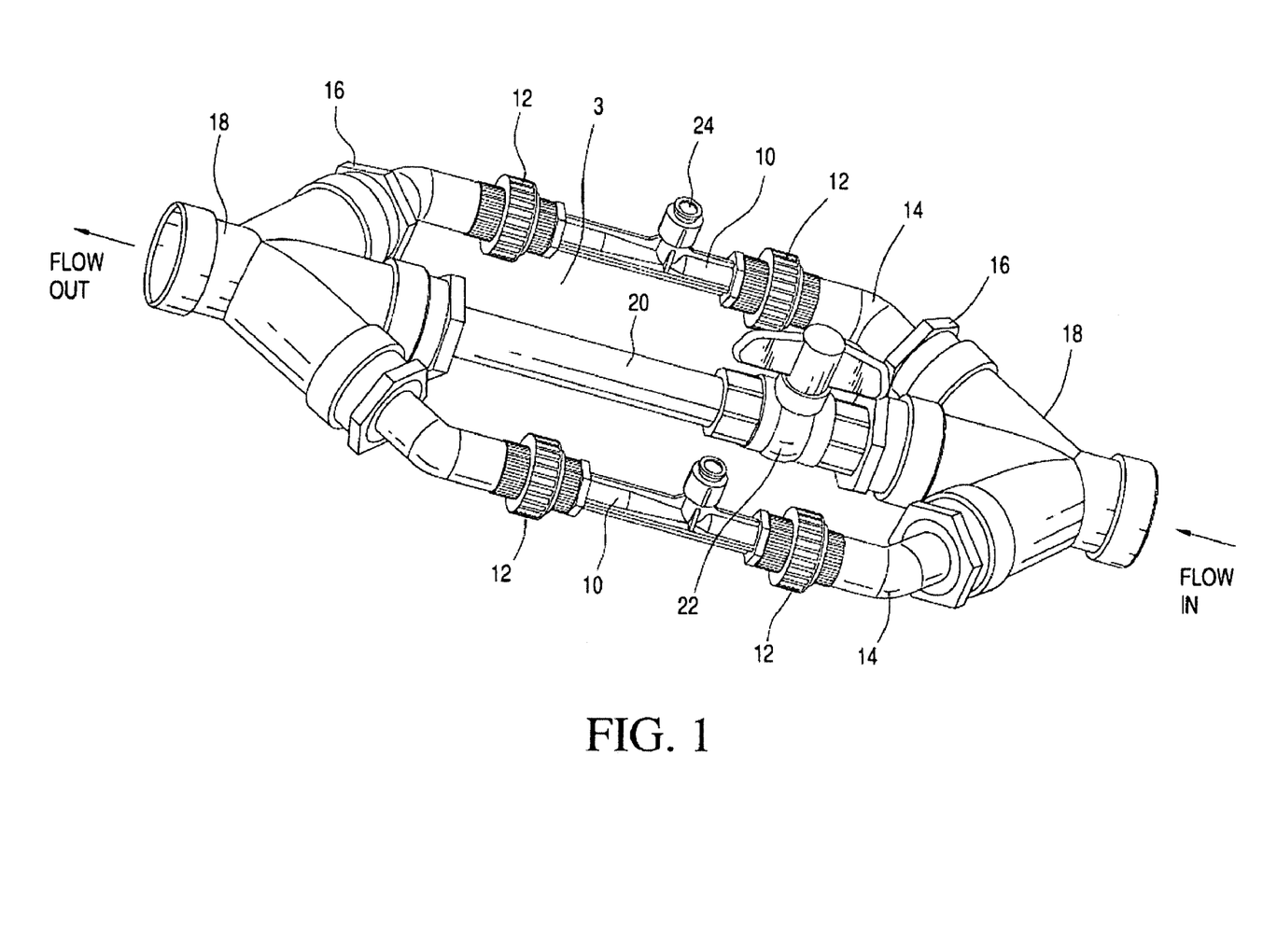
FIG. 1 is a perspective view of a micro diffuser manifold.

FIG. 1 shows a perspective view of the preferred micro diffuser manifold 3 as used in an embodiment of the present invention. The manifold consist of two air injection units 10 connected by way of quick disconnects 12 and PVC "elbows" 14 and PVC bushings 16 to a set of PVC double "WYEs" 18. The main trunk of the "WYEs" 18 are connected with bushings 16 and a length of PVC pipe 20. The wastewater flow through the pipe 20 may or may not be further restricted by use of a ball valve 22. Flow of wastewater entering the "WYE" from a larger diameter pipe is split by the "WYE" 18 and bushings 16 into the three smaller branches. This creates a pressure drop across the manifold 3. As the wastewater flows through the two branches with the air injection units 10, this drop in pressure causes air to be pulled into the units by way of the vented cap 24. The aerated wastewater from the two branches of the manifold 3 is mixed with the wastewater from a main line 20 back together at the second "WYE" 18, and flow out of the manifold 3 together.

Figure 2:
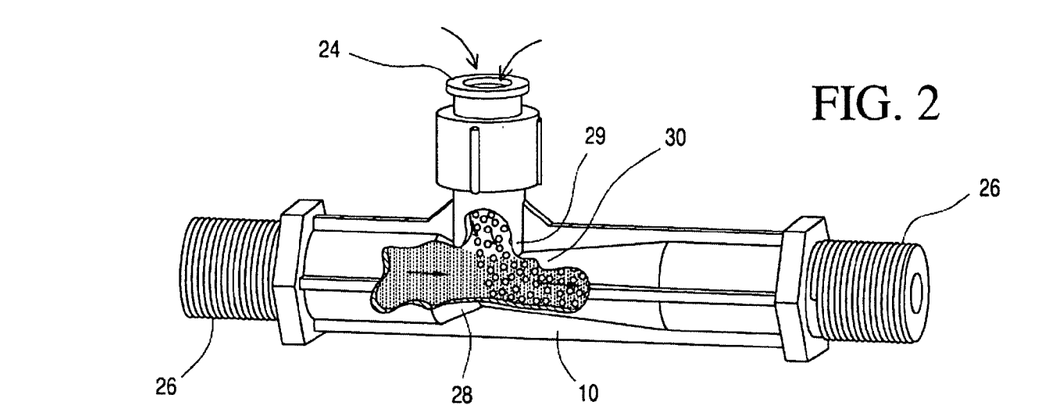
FIG. 2 is a side view of an individual drainage product with an air injection unit.

FIG. 2 shows a more detailed and partially exposed view of the preferred air injection unit 10. The unit 10 has male threaded ends 26 for connection to the female threaded quick disconnects 12 as shown in FIG. 1. The reduced throat 28 can be seen where the throat 29 of the air vent 24 merges to form the outlet channel 30.

Figure 3A:
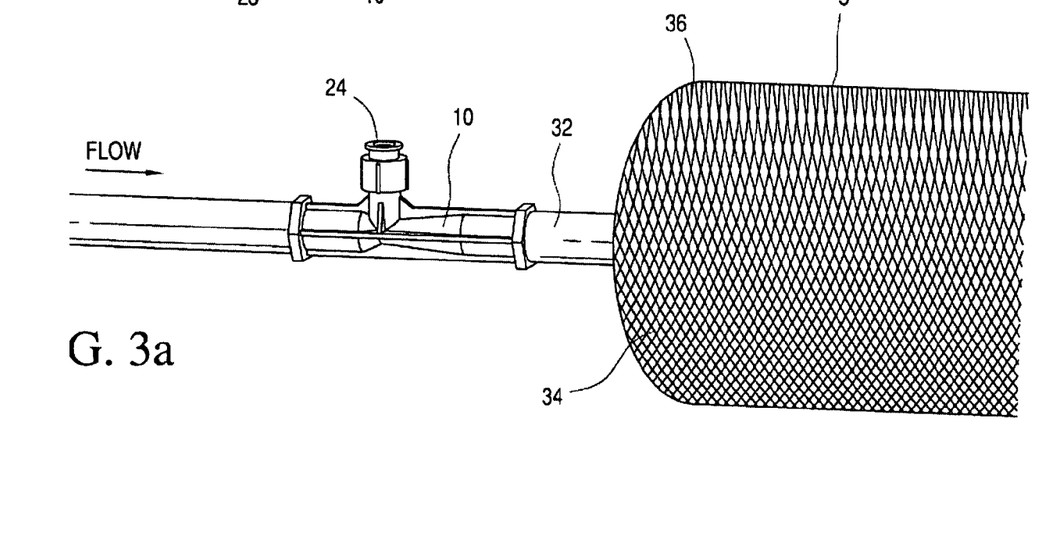
FIG. 3a is an angled view of an individual drainage product with an air injection unit attached to the aggregate bundle.

FIG. 3a shows another embodiment of the present invention. As an alternative to connecting the air injection units 10 together by way of a manifold 3, the units 10 may be connected directly to the drainage product 5. In this preferred embodiment, the drainage product 5 is a small diameter polymeric styrene-containing aggregate bundle preferably having a ¾ inch tube 32 which has 5/32 inch orifices spaced about every 40 inches along its length. The tube or conduit 32 is surrounded by small diameter expanded polystyrene-containing beads, or aggregate 34 contained by netting 36 to form bundles having a predetermined dimension. It is understood that the aggregate may be presented in block form not requiring a netting to retain loose pieces of aggregate.

Figure 3B:
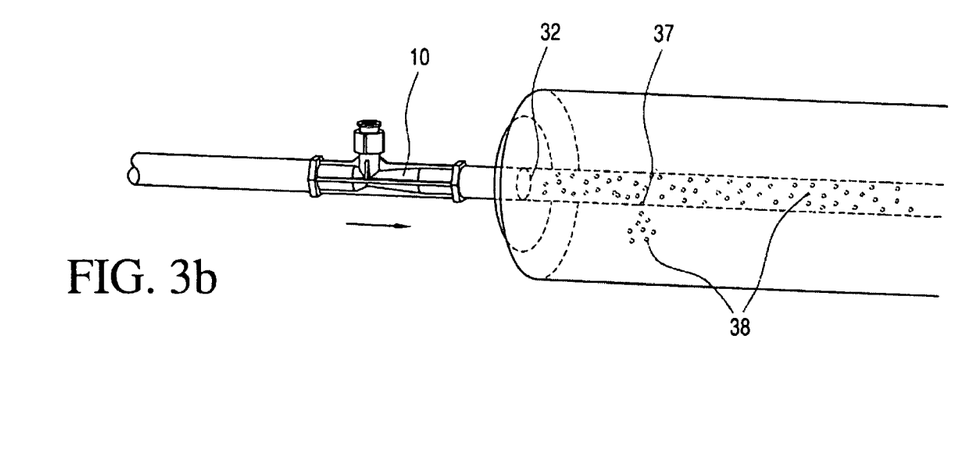
FIG. 3b is an exposed view of an individual drainage product with an air injector unit attached to an aggregate bundle.

FIG. 3b shows a partially transparent view of one embodiment of the present invention shown in FIG. 3a. This view shows the wastewater flow comprising micro bubbles of air and oxygen moving from the air injection unit 10 into the ¾ inch tube 32 inside the drainage product 5. Aerated effluent 38 discharges out of an orifice 37 in the ¾ inch tube 32 and into the aggregate, and eventually into the surrounding environment (e.g. soil, etc.). Aerated effluent 38 also continues along the length of the tube 32 to the next orifice and beyond.

Figure 3C:
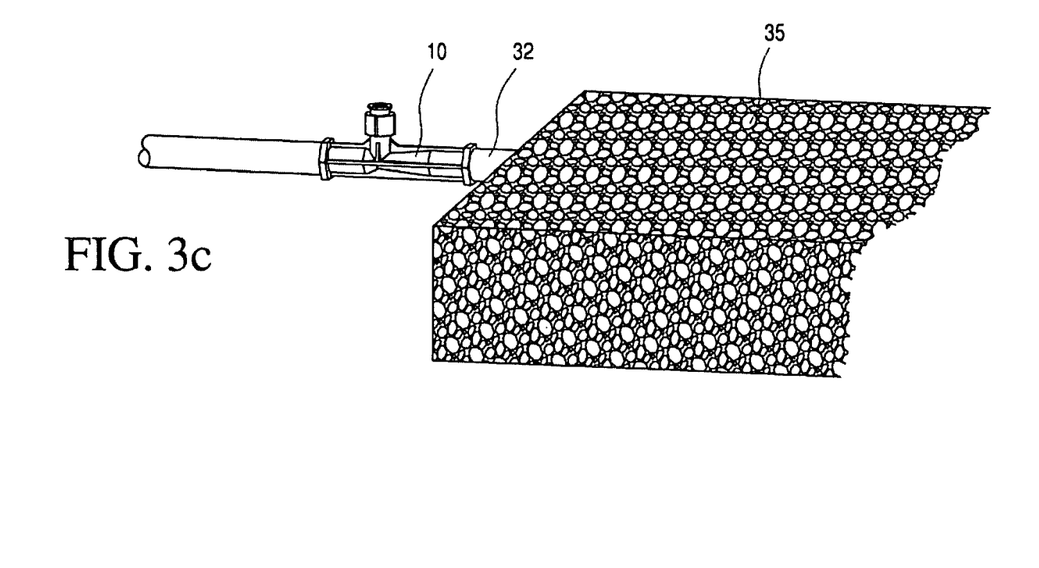
FIG. 3c is an angled view of an individual drainage product with an air injector unit surrounded by gravel.
Figure 3D:
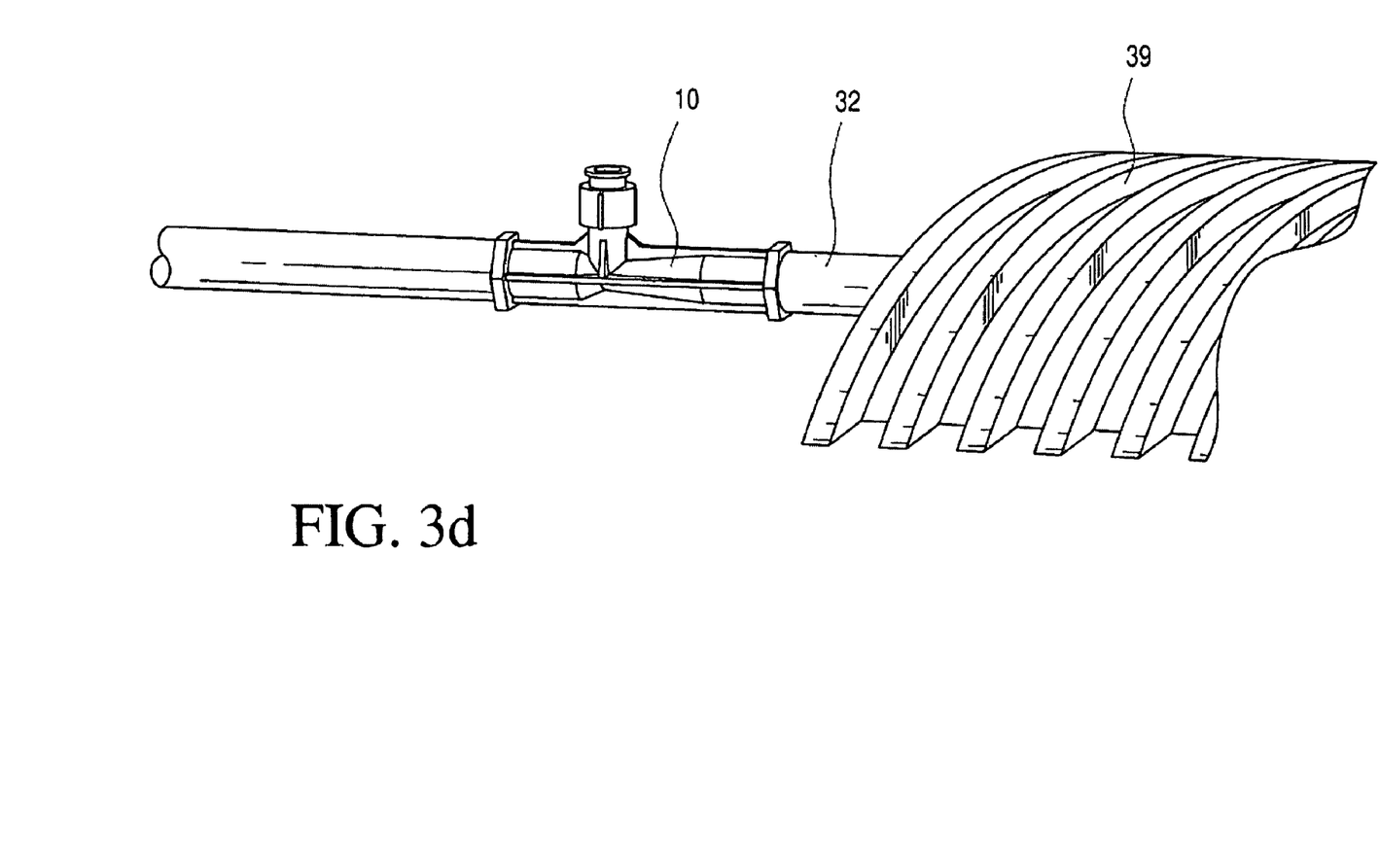
FIG. 3d is an angled view of an individual drainage product with an air injector unit and conduit inside a leaching chamber.

FIG. 3c shows a further embodiment of the present invention. Rather than having the ¾ inch tube 32 contained within a drainage product 5 as shown in FIGS. 3a and 3b, the tubing is surrounded by gravel 35. In another embodiment, as shown in FIG. 3d, the drainage product is a leaching chamber 39.

Figure 4:
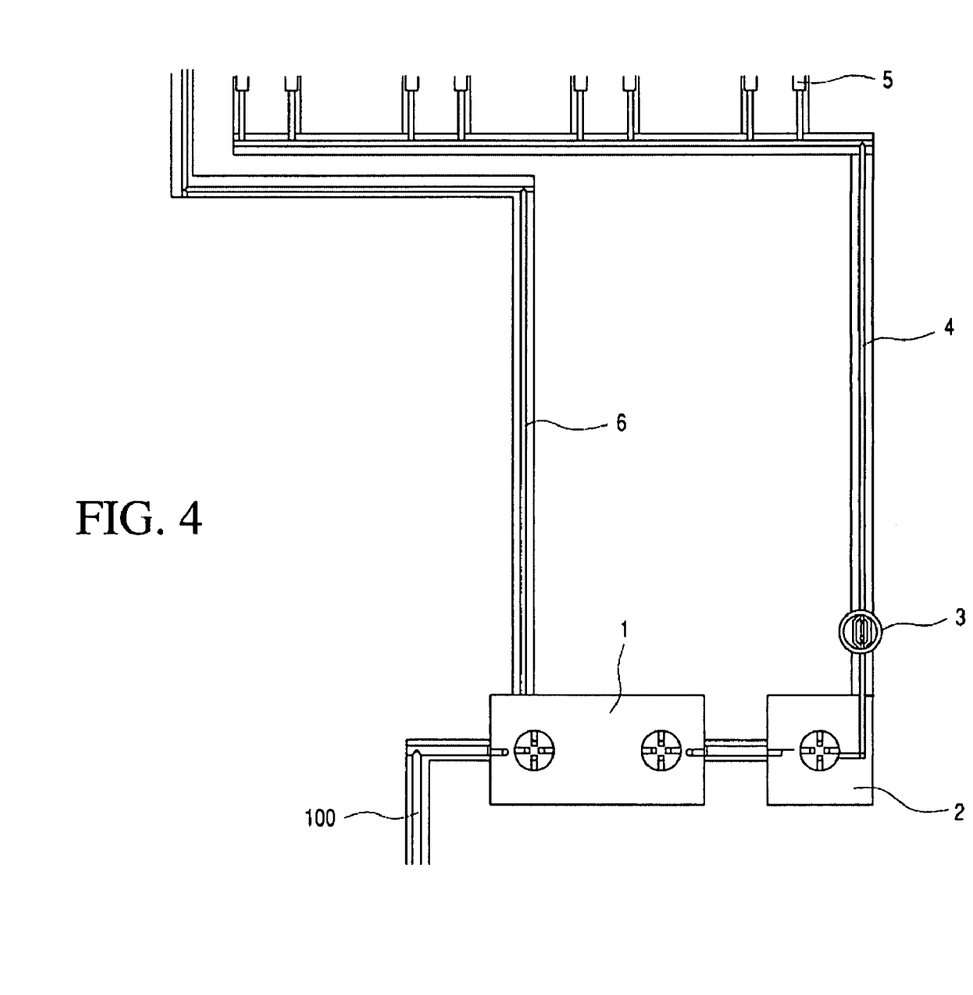
FIG. 4 is an overhead view of a drainage product system.

FIG. 4 shows an overhead view of an entire bundle drainage product system. Sewage enters the septic tank 1 from a source by way of a sewer line 100. The wastewater enters a pump tank 2 from the septic tank 1. The wastewater is then dosed into the micro diffuser manifold 3 where it becomes mixed with air or the selected gas or liquid source of choice. The aerated wastewater is then sent via a supply manifold 4 to a series of drainage products 5 as effluent. A percentage of the aerated effluent is dosed into the soil based treatment field by way of the orifices present in the ¾ inch conduit or tube 32 within the drainage product 5 (not shown). The remainder of the aerated effluent is returned via a return line 6 to the septic tank 1 to mix with the mainly untreated sewage from the source.

Figure 5:
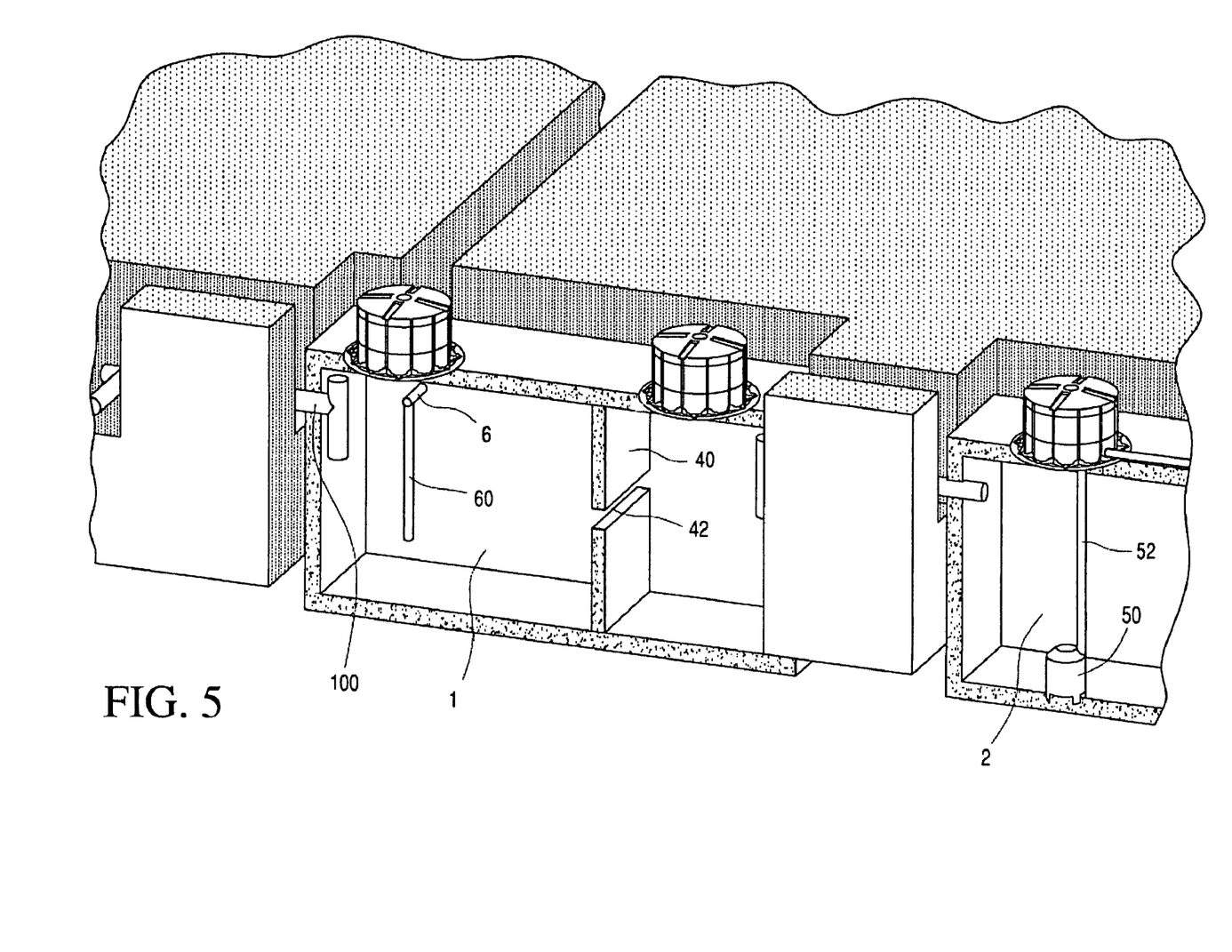
FIG. 5 is a cross-sectional view of the septic and pump tanks of drainage product system.

FIG. 5 shows further preferred features of the septic tank 1 and the pump tank 2. Raw sewage enters the septic tank by way of a sewer pipe 100. Here the raw sewage that is high in carbon content mixes with the aerated effluent that is returned to the septic tank by way of the return line 6 and the down spout 60 shown to extend below the water line of the tank 1. The mixed wastewater flows through a baffle wall 40 by way of an opening 42 into a second compartment of the septic tank 1. This wastewater then flows into the pump tank 2, and is then dosed out of the pump tank 2 by aid of a pump 50 and discharge pipe 52 into the micro diffuser manifold. The dosing cycle is preferably controlled by a timed dose control panel (not shown). The use of a control panel allows an operator (e.g. home owner, etc.) to maximize both the time needed for the desired biochemical reactions to occur in the septic tank and in the ¾ inch tube as well as the time for the soils to treat the effluent.

Figure 6A:
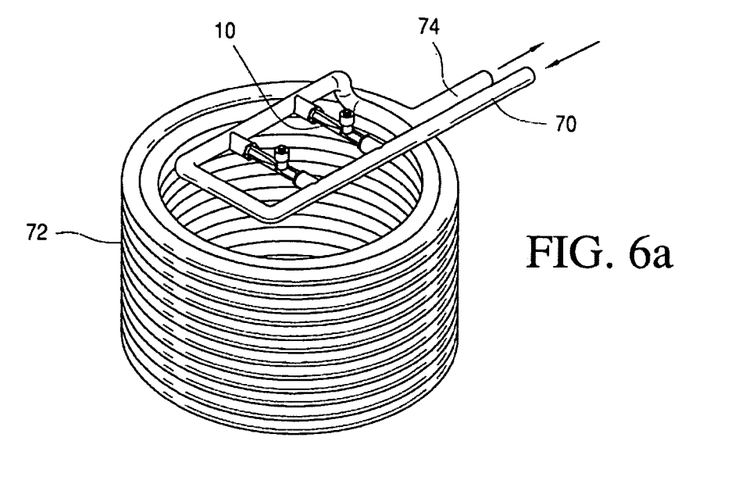
FIG. 6a is an angled view of a treatment coil.

Yet another preferred embodiment of the invention is shown in FIG. 6a, where a coil of tubing 72 having an inlet 70 is connected to two air injection units. Wastewater and/or effluent fluid enters the inlet 70 and flows through the air injection units 10. From this point, the fluids proceed through a coil of tubing 72 having a predetermined inner diameter and predetermined length. The aerated wastewater and/or effluent then exits the coil of tubing via outlet 74.

Figure 6B:
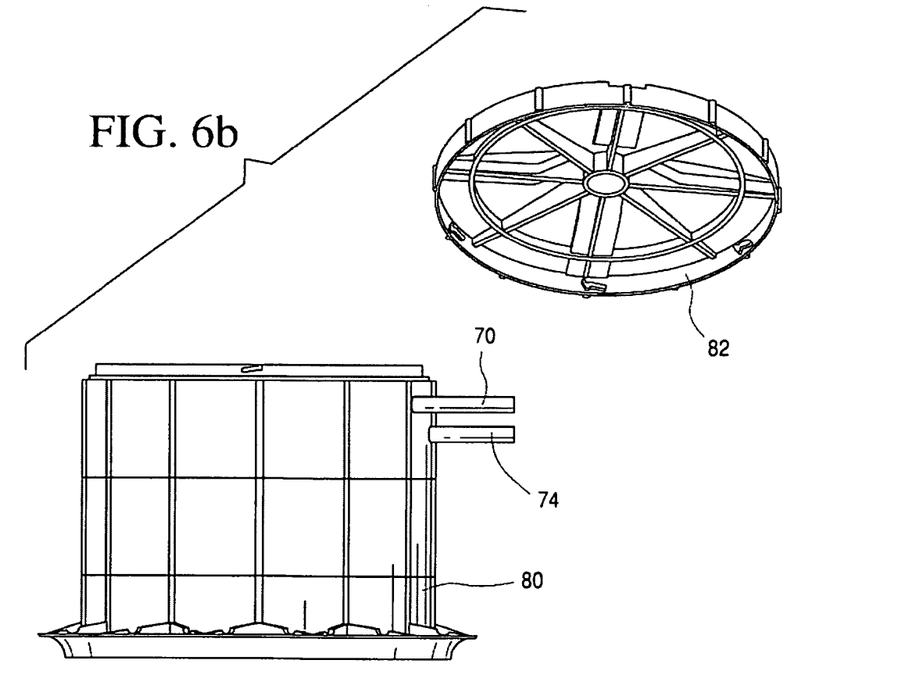
FIG. 6b is a side view of a septic tank riser containing a coil of conduit or treatment coil.
Figure 7:
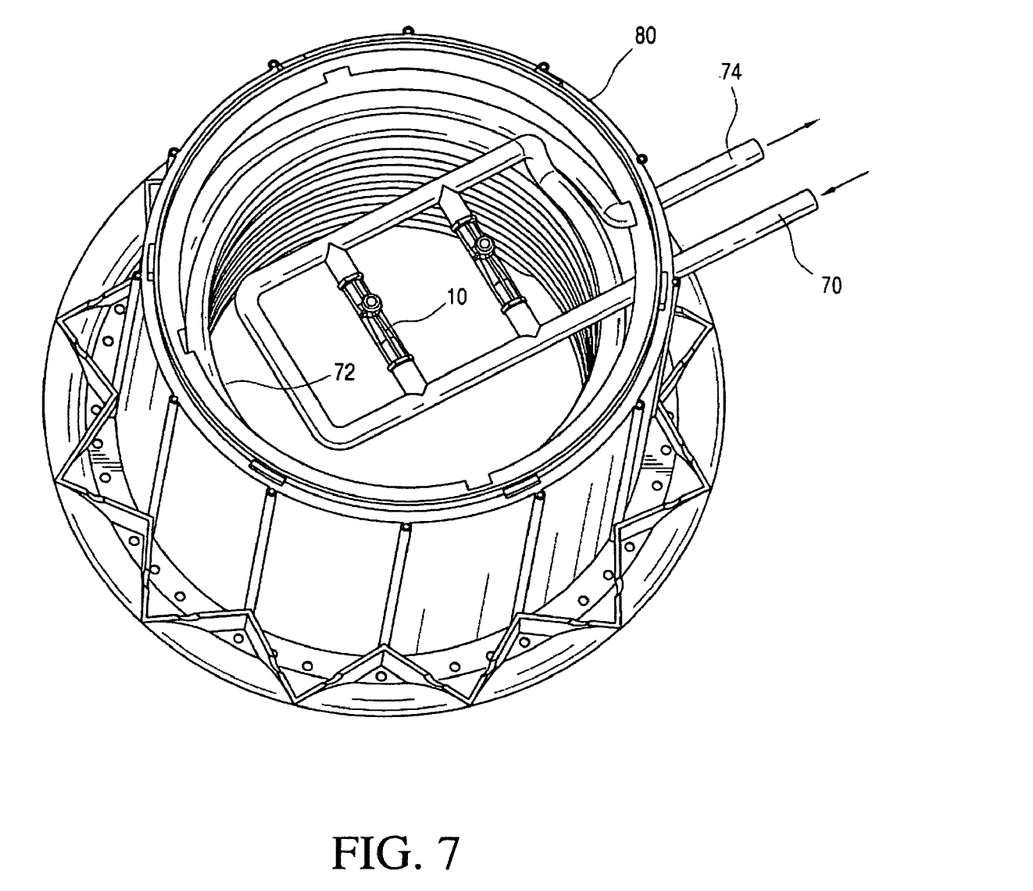
FIG. 7 is an overhead view of the treatment coil of FIG. 6.
Figure 8:
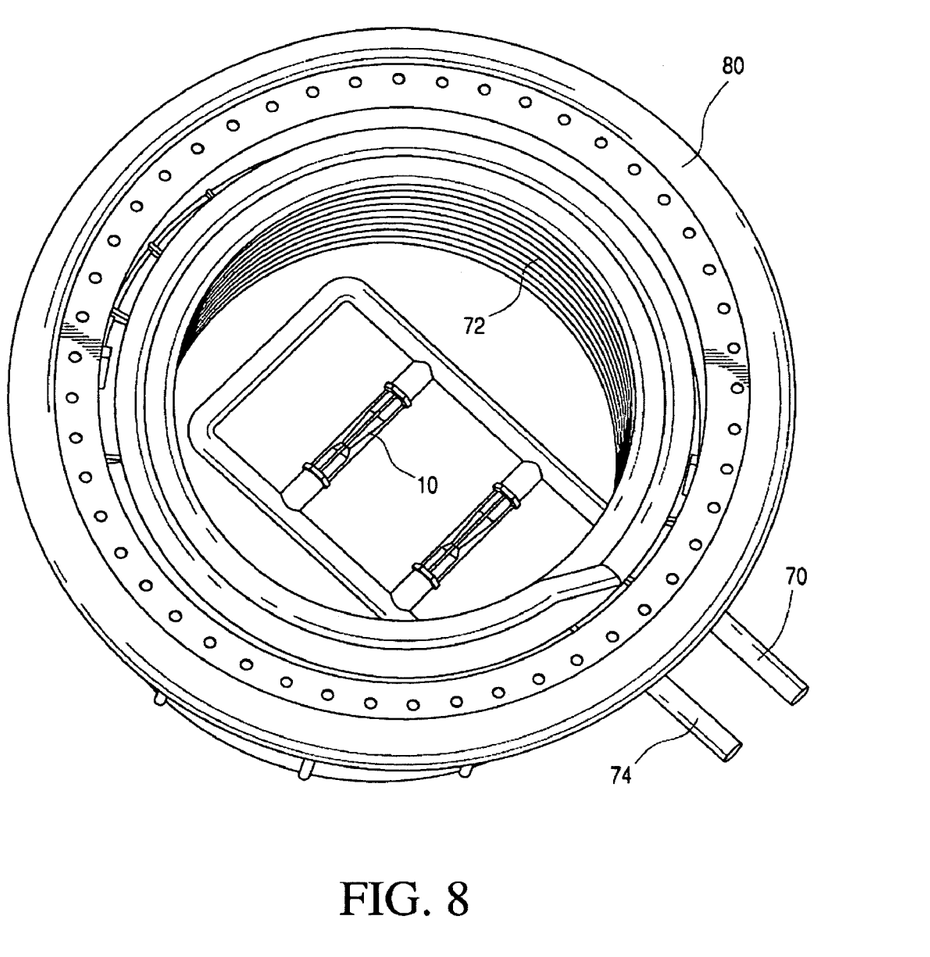
FIG. 8 is a bottom view of the treatment coil of FIGS. 6 and 7.

As shown in FIG. 6b, the inlet 70 and the outlet 74 extend out from the side of an access riser assembly 80 (with lid 82) that can be mounted to the top of a septic tank. FIG. 7 shows an overhead view of the treatment coil of FIG. 6b with tube 72 spiraling in a downward coil after it exits from the air injection units 10. The tube coils back on itself and exits through the riser 80, with the wastewater fluid then passing from the outlet 74. FIG. 8 shows the assembly shown in FIG. 7 from a bottom view looking up into the assembly.

According to the preferred systems, apparatuses and methods of the present invention, in one embodiment, a small polyethylene tube (¾" diameter) having 5/32" holes through the tube are spaced from about 3' to about 4' along its length, and preferably spaced about every 40". The tube is encased within a bundle of aggregate, said aggregate held in place by porous netting. A cavitating venturi-type mixer-injector is preferably associated in communication with each tube. In operation alone, the mixer-injector passively introduces atmospheric oxygen in air into the wastewater flow passing through the tube. The mixer-injector design allows the wastewater flow passing there through, to "draw" air into the line "passively". However, further embodiments of the present invention contemplate the active (e.g. positive pressure) introduction of any gas, fluid or mixture thereof into the wastewater line (via e.g. a pump, etc.), as well as the passive introduction of other gases and/or fluids.

Introducing the air into the wastewater flow produces an aerated fluid, preferably having micro-bubbles of oxygen present in the fluid flow. The aerated wastewater is then dosed into the aggregate and eventually into the surrounding soil where the added oxygen also increases the soil's ability to treat organic matter. Alternatively or additionally, the aerated effluent is returned to the primary septic tank. The primary septic tank represents an anoxic zone that has a readily available source of carbon, thus creating the conditions necessary to initiate the Nitrogen Cycle, further reducing the amount of nitrogen within the wastewater. It is understood that, according to embodiments of the present invention, air is introduced into the same conduit responsible for delivering the effluent, preferably from a holding tank, such as a septic tank to an end point location, preferably a drainage field.

According to the preferred embodiments of the present invention, when conduit orifices are set at a diameter of about 5/32", pressure will be generated at a system rate of about 0.43 psi, resulting in a flow emerging from the orifices of about 0.29 gal./min. This is strong contrast to known drip systems able to yield only 0.5 gal./hr.

It is understood that the source material to be added to the wastewater line or conduit may be any desired material that assists in the desired treatment of the effluent. While the specific examples below show the addition of air as the source material for the production of micro bubbles, it is understood that, according to embodiments of the present invention, any gas or fluid may act as the source material, and that additional components may be added or sourced to the effluent flow including, but not limited to herbicides, pesticides, biocides, acids, bases, UV inhibitors, etc.

When air or oxygen is sourced to the wastewater flow as the source material, it is desired, according to embodiments of the present invention, that the wastewater undergo pretreatment at least due to the presence of air in the source material, such that the wastewater in the conduit (and subject to pretreatment), and leaving the conduit, comprise a dissolved oxygen (DO) level of from about 1 to about 10, and more preferably from about 4 to about 8 ppm oxygen. Similarly, the wastewater in the conduit undergoing pretreatment is understood to have a preferred Reynold's number of from about 1,800 to about 20,000, more preferably from about 2,100 to about 10,000.

Further, while a venturi-containing device assists in the passive introduction of sourcing material to the effluent flow, and represents one preferred embodiment of the present invention, various means may be employed to actively introduce and combine wastewater and sourcing material (air, oxygen etc.) to the conduit.

The arrangement of the conduit containing the wastewater undergoing pretreatment is particularly important. Embodiments of the present invention contemplate orienting the conduit in both linear and non-linear fashion, as desired, depending upon space constraints and other factors. Therefore, in one particularly preferred embodiment as shown in the FIGS. 6-8, the conduit may be coiled about itself and retained in a tank or riser, thus minimizing the need and expense for the subterranean placement of the conduit in an expansive drain field. Certain applications of the present invention may contemplate no coiling of the conduit, such that the conduit remains substantially linear as portions of effluent pretreated within the conduit may be directed to the drain field. Similarly, the conduit may be oriented into any quasi-geometric or quasi-linear orientation, as desired by a user and dictated by the eventual end use and the desired wastewater and effluent treatment levels, including various space-saving orientations.

As mentioned above, while a portion of the wastewater that is pretreated within the conduit may eventually be released to the environment as effluent according to accepted environmental standards, a portion of the effluent is not released to the environment initially, but is returned to the septic tank or a supplemental holding and/or pump tank that is in communication with the conduit for further recirculation within the overall wastewater treatment system. A portion of the effluent may also be redirected to an alternate drain field or other desired final destination, or holding site or station for further treatment before again being directed from the holding site or station.

EXAMPLES

The various attribute of the present invention as compared with known solutions is presented in chart form in Table 1 below.

TABLE 1

| Attribute | Gravel Drain Field | Alternative Drain Field | LPP (Gravel) | LP (Alternatiive) | Drip | Micro Dispersal |
|---|---|---|---|---|---|---|
| Pressure Distribution | * | * | * | * | * | * |
| No Fines | | * | | * | * | * |

TABLE 1-continued

| Attribute | Gravel Drain Field | Alternative Drain Field | LPP (Gravel) | LP (Alter- natiive) | Drip | Micro Dispersal |
|---|---|---|---|---|---|---|
| Shallow Placement | | | * | * | * | * |
| Root Uptake | | | * | * | * | * |
| Evaporation Transpiration | | | | | * | * |
| Long/Narrow Design | | * | * | * | * | * |
| Uniform Distribution | | | * | * | * | * |
| Manufactured Product | | * | | * | * | * |
| Storage Volume | * | * | * | * | | * |
| Trench Infiltrative Area | * | * | * | * | | * |
| Surface Area for Biological Growth | * | * | * | * | | * |
| Aeration of Effluent | | | | | | * |

Embodiments of the present invention contemplate significant cost and processing savings as the system allows for effluent recirculation, thus reducing the risk of wastewater clogs in the "terminal" end of the drainage field assembly, as there no longer is a true terminal end, but a circulating system. In addition, the present invention is effective with ambient air entering the system via the mixer-injector feature that is capable of drawing air into the system without need of a pump. However, if desired, a pump may be brought on line in certain embodiments where desired. According to embodiments of the present invention, there is no need for pretreatment of the effluent or need of a lifting station before the effluent is directed to the drainage fields. In addition, the piping involved with aeration orifices may be supplied along with the aggregate in standardized, connectable sections able to be deployed as needed to cover any length required for shallow trench placement. This feature obviates the need to custom fit segments of the apparatus, enabling a reduced inventory and lowering system cost. Other advantages would be readily apparent to one skilled in the field.

While the present invention has been described in detail with reference to specific embodiments thereof, it will be apparent to one skilled in the field that various changes, modifications and substitutions can be made, and equivalents employed without departing from, and are intended to be included within, the scope of the claims.

We claim:

1. A method for treating wastewater in a system comprised of a septic tank and a drainage field comprised of one or more drainage products buried in soil which comprises:
   (a) treating wastewater in a septic tank;
   (b) flowing pressurized wastewater from the septic tank to at least one device adapted for combining an oxygen-containing gas source material with wastewater;
   (c) mixing oxygen-containing gas source material with the pressurized wastewater as the wastewater flows through said at least one device;
   (d) flowing wastewater from said at least one device through a conduit coupled thereto;
   (e) at least partially treating the wastewater aerobically within the conduit with said oxygen-containing gas source material as the wastewater flows within the conduit;
   (f) flowing at least a portion of said treated wastewater from the conduit to a drainage field comprised of one or more drainage products buried within soil; and,
   (g) flowing wastewater from said one or more drainage products into the soil.

2. The method of claim 1, further comprising:
   providing a second device like the first device, connected in parallel with the first device to the conduit and the septic tank;
   providing a pipeline running in parallel with the first and second devices, the upstream end of the pipeline in communication with the septic tank and the downstream end in communication with the conduit, the pipeline having valve means for controlling the flow of wastewater therethrough;
   flowing pressurized wastewater from the septic tank simultaneously through the two devices and the pipeline;
   mixing said oxygen-containing gas source material with the wastewater as it flows through each device;
   combining the wastewater flowing from said devices and the pipeline at the upstream end of said conduit; and,
   adjusting said valve means to thereby control the fraction of wastewater which flows through said first and second devices.

3. The method of claim 1, wherein said gas source material is air drawn into said at least one device from the surrounding atmosphere by venturi action of pressurized wastewater flowing through said at least one device.

4. The method of claim 1, wherein said gas source material is air.

5. The method of claim 1, further comprising:
   providing a second device like the first device, connected in parallel with the first device to the conduit and the septic tank;
   flowing pressurized wastewater from the septic tank simultaneously through the two devices;
   mixing said oxygen-containing gas source material with the wastewater as it flows through each device; and,
   combining the wastewater flowing from said devices within said conduit.

6. The method of claim 1 wherein, as part of step (d), the water is flowed in a spiraling direction through a conduit having a coil shape.

7. The method of claim 6 wherein said septic tank further comprises a vertical riser; and wherein as part of step (d) the water is flowed in a spiraling direction through a coil shape conduit positioned within the riser of the septic tank.

8. The method of claim 2 wherein, as part of step (d), the water is flowed in a spiraling direction through a conduit having a coil shape.

9. The method of claim 6 wherein said septic tank has a riser; and wherein as part of step (d) the water is flowed in a spiraling direction through a coil shape conduit positioned within the riser of the septic tank.

10. The method of claim 1, wherein said drain field product is selected from the group comprising leaching chambers, aggregate, aggregate bundles, and a tube having a multiplicity of lengthwise spaced apart orifices.

11. The method of claim 1, further comprising the step of: flowing a portion of said at least partially treated wastewater which flows from the conduit back to a point upstream of said device.

* * * * *